(12) United States Patent
Parsons (10) Patent No.: US 8,215,614 B2
(45) Date of Patent: Jul. 10, 2012

(54) TWO POSITION ACTUATOR IMPACT LIMITER

(75) Inventor: Gerald R. Parsons, Caledonia, IL (US)

(73) Assignee: Schneider Electric Buildings, LLC, North Andover, MA (US)

( * ) Notice: Subject to any disclaimer, the term of this patent is extended or adjusted under 35 U.S.C. 154(b) by 1193 days.

(21) Appl. No.: 12/025,401

(22) Filed: Feb. 4, 2008

(65) Prior Publication Data
US 2009/0194724 A1 Aug. 6, 2009

(51) Int. Cl.
*F16K 51/00* (2006.01)

(52) U.S. Cl. ............... 251/286; 251/80; 251/248

(58) Field of Classification Search ............ 251/64, 251/68–71, 114–116, 248, 250, 284–286, 251/288, 77–81; 74/439
See application file for complete search history.

(56) References Cited

U.S. PATENT DOCUMENTS

| | | | |
|---|---|---|---|
| 2,205,512 A | 6/1940 | Anderson, Jr. | |
| 2,591,951 A | 4/1952 | Lowry | |
| 2,646,074 A | 7/1953 | Hopkins | |
| 2,761,424 A | 9/1956 | Hopkins | |
| 2,855,828 A | 10/1958 | Girouard et al. | |
| 3,319,646 A | 5/1967 | Smulka | |
| 4,090,589 A | 5/1978 | Fitzwater | |
| 4,533,114 A | 8/1985 | Cory et al. | |
| 4,702,123 A | 10/1987 | Hirao et al. | |
| 4,705,063 A | 11/1987 | Robinson | |
| 5,062,611 A | 11/1991 | Hatton | |
| 5,205,534 A | 4/1993 | Giordani | |
| 5,310,021 A | 5/1994 | Hightower | |
| 6,073,907 A * | 6/2000 | Schreiner et al. | 251/129.12 |
| 6,408,901 B2 | 6/2002 | Holloway et al. | |
| 6,634,480 B2 * | 10/2003 | Peter et al. | 192/224 |
| 6,913,241 B2 * | 7/2005 | Bernarding et al. | 251/129.12 |
| 6,918,572 B2 | 7/2005 | Minegishi et al. | |
| 7,017,884 B2 | 3/2006 | Brinks et al. | |
| 7,032,877 B2 * | 4/2006 | von Willich | 251/78 |
| 2001/0032616 A1 * | 10/2001 | Sakurai et al. | 123/399 |
| 2004/0226538 A1 | 11/2004 | Cannone et al. | |
| 2005/0056800 A1 * | 3/2005 | Modien | 251/64 |
| 2005/0062000 A1 | 3/2005 | Bartell, Jr. et al. | |
| 2005/0151102 A1 | 7/2005 | Brinks et al. | |
| 2005/0269535 A1 | 12/2005 | Bartell, Jr. et al. | |

FOREIGN PATENT DOCUMENTS

| | | |
|---|---|---|
| EP | 1 347 249 A1 | 9/2003 |
| WO | WO 99/24745 A1 | 5/1999 |

* cited by examiner

*Primary Examiner* — John Fristoe, Jr.
*Assistant Examiner* — Jessica Cahill
(74) *Attorney, Agent, or Firm* — Reinhart Boerner Van Deuren P.C.

(57) ABSTRACT

A valve actuator for controlling a valve is provided. The valve actuator includes a torque transfer arrangement interposed between a return spring and a drive gear, the drive gear being biased by loading provided by the return spring. A drive coupling is interposed between the drive gear and the return spring and transfers load of the return spring to the drive gear. A torque transfer arrangement between the drive gear and drive coupling permits limited relative angular movement of the drive coupling relative to the drive gear.

16 Claims, 9 Drawing Sheets

TWO POSITION ACTUATOR IMPACT LIMITER

FIELD OF THE INVENTION

This invention generally relates to valve actuators and particularly to electric motor driven valve actuators that include a fail-safe configuration that returns the valve to a predetermined position when power is lost to the electric motor.

BACKGROUND OF THE INVENTION

Numerous valve actuators, and particularly valve actuators for heating/cooling valves, incorporate an electric motor as the primary power source to operably drive the valve between an open condition and a closed condition. A gear train amplifies and transfers the torque from the motor to the valve. More particularly, the valve actuator rotates a valve member or manipulates a fluid control device, typically a ball, between the open and closed conditions.

Some valve actuators incorporate a return spring coupled to the gear train to drive the gear train in the opposite direction and return the valve member to a predetermined position when power is removed from the motor. The return spring is stretched as the gear train is driven by the electric motor and stores potential energy until the electric motor is de-energized. When the motor is de-energized the return spring contracts and back drives the gear train returning the valve member to the desired predetermined position, e.g. an open position or a closed position.

For example, a normally closed configuration will be configured such that if power is lost, the return spring will back drive the gear train to a predetermined position in which the actuator closes the valve, through the use of the mechanical energy stored in the spring. Conversely, a normally open configuration will be configured such that if power is lost, the return spring will back drive the gear train to a predetermined position in which the actuator opens the valve, through the use of the mechanical energy stored in the spring.

Depending on the configuration of the valve, a valve actuator that operates in a clockwise direction or a valve actuator that operates in a counter-clockwise direction may be required.

The electric motor extends the return spring as it rotates the valve member within the valve. Under control of the electric motor, drive speed of the gear train is limited by the electric motor. However, once power to the electric motor is removed, the spring retracts and the gear train is back driven. In this situation, the spring return speed is limited only by the gear train and valve resistance. With limited to no resistance, the return speed can be come excessive and destroy the gear train when the gear train encounters or impacts a positive stop at the end of the rotation of the gear train. This is particularly true when the gear train is under the load of the return spring and is being accelerated by the return spring as the gear train impacts the positive stop.

The present invention is aimed at improvements with regard to such valve actuators and preventing uncontrolled and detrimental effects of back driving of the gear train when the electric motor of the valve actuator is de-energized.

BRIEF SUMMARY OF THE INVENTION

The present invention has several aspects that may be claimed and stand as patentable independently and individually or in combination with other aspects, including but not limited to the following.

In one aspect, the invention provides a valve actuator including a motor, a drive gear, a support structure, a drive coupling and a torque transfer arrangement. The torque transfer arrangement prevents damage to the drive gear or other components of the valve actuator due to impact loads on the drive gear due to loading by a return spring. The drive gear is operably coupled to the motor. The support structure supports the motor and the drive gear. The drive gear is mounted to the support structure for rotation about an axis. The drive coupling operably couples a return spring to the drive gear. The return spring is operably coupled to the support structure and acts between the support structure and the drive coupling to rotationally bias the drive gear about the axis.

The torque transfer arrangement is interposed between the drive gear and drive coupling and is configured to operably transfer torque about the axis between the drive coupling and the drive gear. The torque transfer arrangement includes at least one slot and at least one peg extending generally parallel with the axis. The peg extends into the at least one slot. The at least one slot has a first width extending generally perpendicular to the axis. The at least one peg has a second width extending generally perpendicular to the axis. The second width is less than the first width such that limited relative angular movement between the drive coupling and drive gear is permitted.

In another aspect, the invention provides a valve actuator comprising a motor, a drive gear, a drive coupling, a torque transfer arrangement and a support structure. The drive gear is operably coupled to the motor. The drive coupling operably couples a return spring to the drive gear. The drive coupling is also coupled to the drive gear for substantially coordinated rotation about an axis of rotation with the drive gear.

The torque transfer arrangement is interposed between the drive gear and drive coupling configured to operably transfer torque about the axis between the drive coupling and the drive gear. The torque transfer arrangement permits a degree of angular movement between the drive coupling and drive gear.

The support structure supports the motor and the drive gear. The drive gear mounts to the support structure for rotation about the axis. The return spring operably couples to the support structure and acts between the support structure and the drive coupling to rotationally bias the drive gear about the axis. The support structure includes a first stop positioned to stop angular movement of the drive coupling in a first rotational direction about the axis at a first angular position relative to the axis and a second stop positioned to stop angular movement of the drive gear in the first rotational direction about the axis at a second angular position relative to the axis. The second angular position is subsequent to the first angular position in the first rotational direction, and the first and second stops being positioned relative to the axis such that the drive coupling and drive gear substantially simultaneously impact the first and second stops, respectively.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
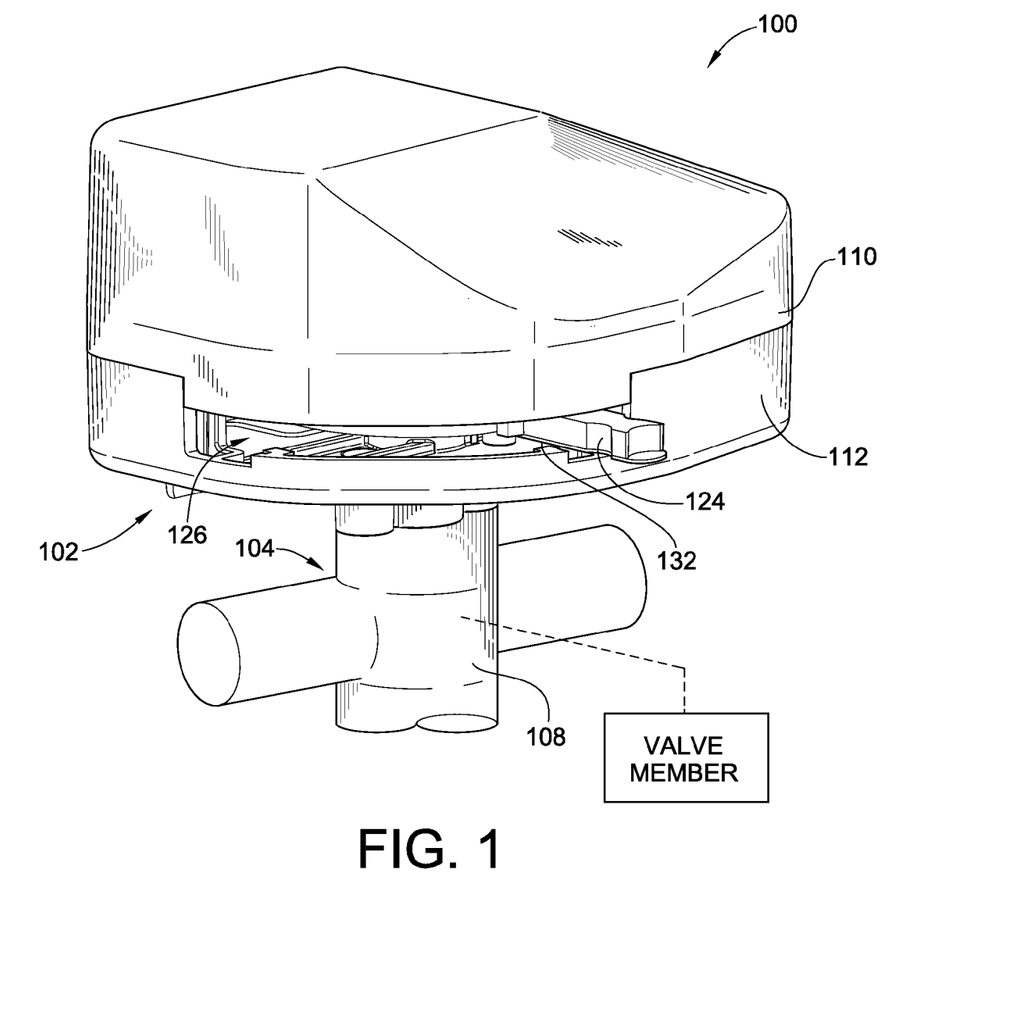
FIG. 1 is an exemplary embodiment of a valve assembly including a valve actuator in accordance with the teachings of the present invention coupled to a valve.

FIG. 1 illustrates a valve assembly 100 including a valve actuator 102 connected to a valve 104. The valve 104 includes an internal valve member (shown schematically in FIG. 1) that moves within valve body 108 between an open position and a closed position, as is well known in the art, to control the flow of fluid therethrough. The valve actuator 102 controls the orientation of the valve member within the valve body 108. Typically, the valve member is in the form of a ball or other fluid controlling device that rotates within the valve body 108.

The valve actuator 102 includes a support structure that supports and houses the internal components of the valve actuator 102. As illustrated, the support structure includes top and bottom housing parts 110, 112.

Figure 2:
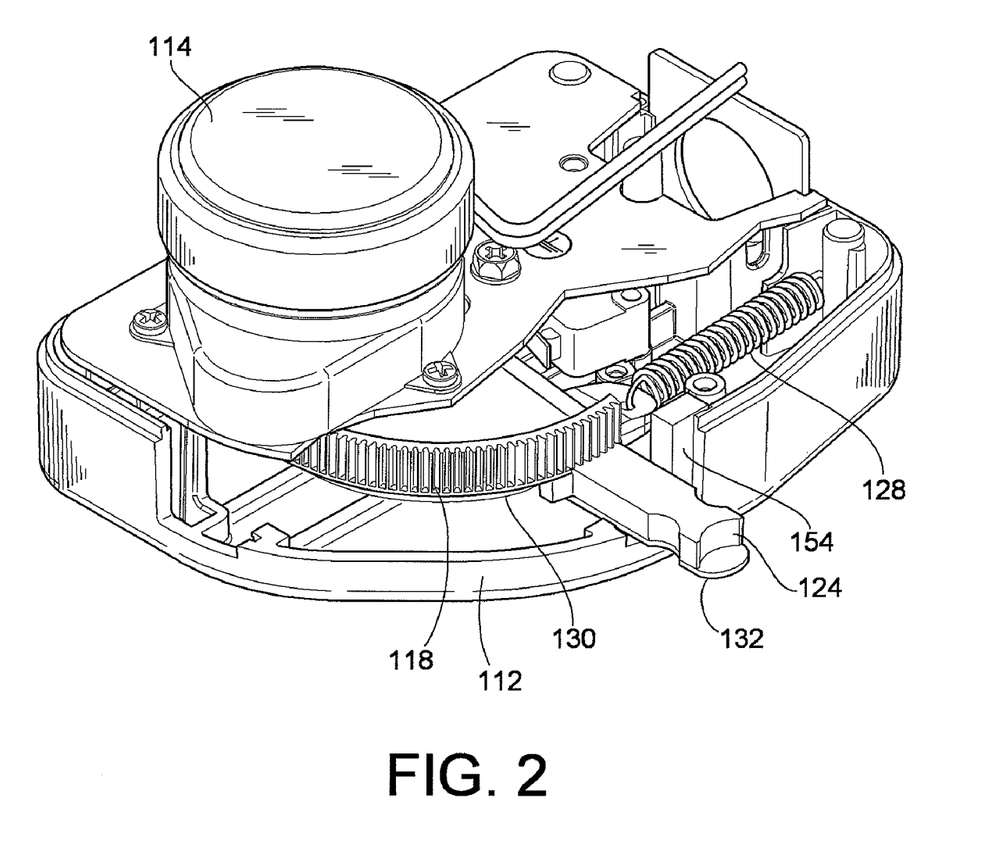
FIG. 2 is a partial isometric illustration of the valve actuator of FIG. with a portion of the housing removed illustrating the internal components of the valve actuator.

With reference to FIG. 2, the valve actuator 102 includes an electric motor 114 that is operably coupled to a drive gear 118, which forms part of a gear train of the valve actuator 102. Both, the motor 114 and drive gear 118, are supported by the support structure, and particularly bottom housing part 112. The electric motor 114 includes a pinion gear (not shown) that engages drive gear 118 such that the electric motor 114 can drive the drive gear 118 about an axis of rotation 120 (see FIG. 3). In operation, the drive gear 118 is operably coupled to the valve member of the valve 104 such that the output of the electric motor 114 is ultimately transferred to the valve member.

The drive gear 118 includes a manual positioning lever 124 that extends out of the support structure through slot 126 (see FIG. 1). The manual positioning lever 124 provides a user operable lever that permits manually controlling the valve actuator 102 and manually setting the position of the valve member via the valve actuator 102. The position of the manual positioning lever 124 relative to the top and bottom housing parts 110, 122 also provides a visual indication of the orientation of the valve member, i.e. whether the valve member is in an open or closed position.

A return spring 128 is operably coupled between the bottom housing part 112 and the drive gear 118 through drive coupling 130. The return spring 128 operates to drive the drive gear 118 about axis 120 toward a predetermined default position when power from the electric motor 114 is lost or otherwise not supplied to the electric motor 114. In FIG. 2, the valve actuator 102 is oriented in the predetermined position, with the manual positioning lever biased against a positive stop by loading provided by return spring 128.

The valve actuator 102 further includes a spring lever 132 that permits locking the position of the drive gear 118 to oppose the load provided by the return spring 128 in the event that it is desired to power-down the electric motor 114. The spring lever 132 engages one of the sidewalls formed by one of the recesses formed in slot 126 of the bottom housing part 112. The spring lever 132 also permits manually setting the valve actuator 102 in a position other than the default position, by preventing the return spring 128 from rotating the drive gear 118 back to the standard position.

Figure 3:
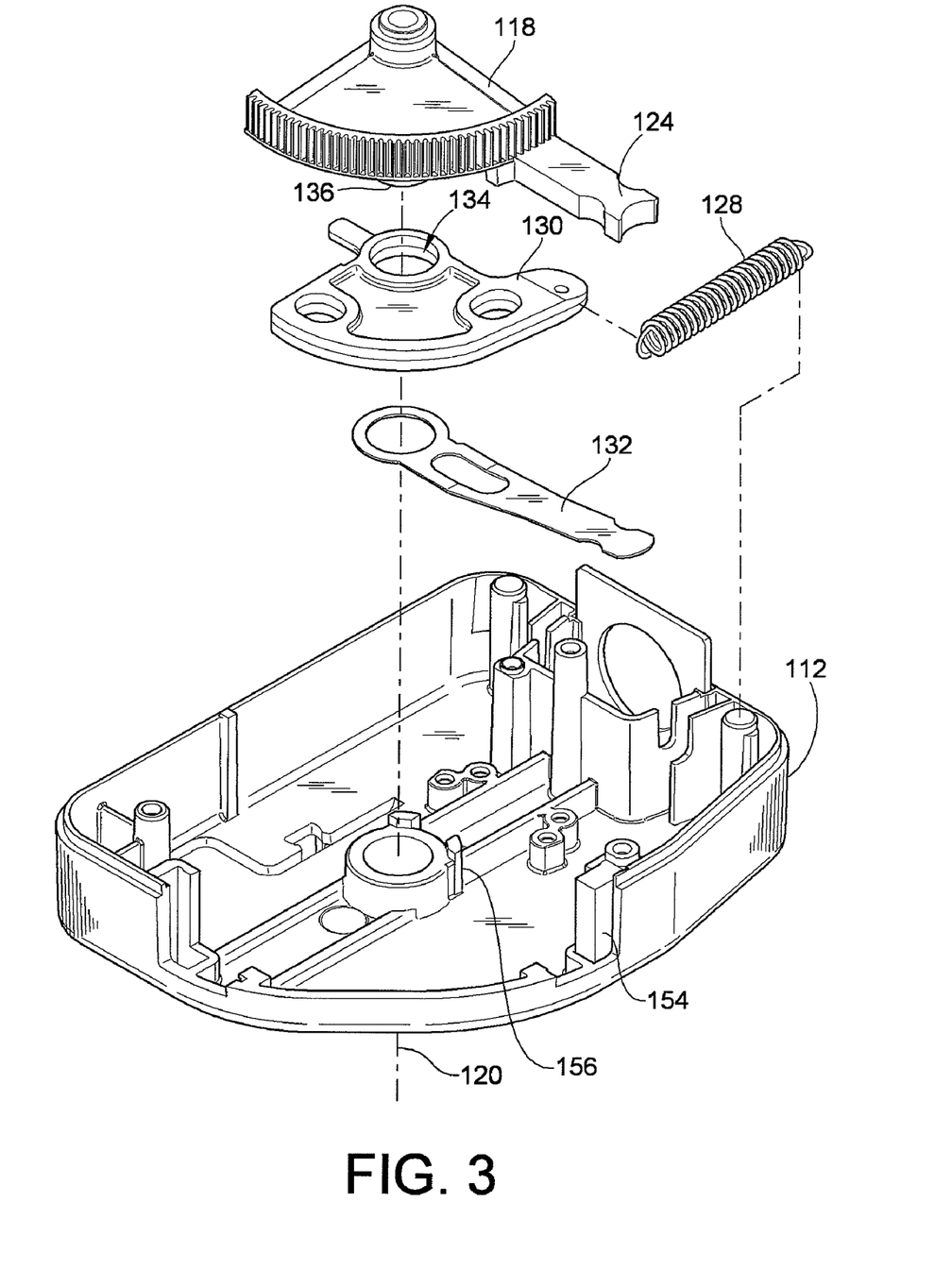
FIG. 3 is a partial exploded illustration of the valve actuator of FIG. 1.

FIG. 3 illustrates a partial exploded illustration of the drive gear 118, drive coupling 130, spring lever and return spring 128. When assembled, drive gear 118, drive coupling 130, and spring lever 132 all of which rotate about axis 120.

The drive coupling 130 operably transfers load of the return spring 128 to the drive gear 118. As such, the drive coupling 130 mounts to the drive gear 118. The drive coupling includes a mounting aperture 134 having an inner diameter closely sized to the outside diameter of a coupling shaft 136 of the drive gear 118 such that the two components are permitted to co-axially rotate about axis 120. The coupling shaft 136 forms a socket (not shown) configured to engage and transfer rotational motion to an end of a valve stem of the valve for controlling the orientation of a valve member.

Figure 4:
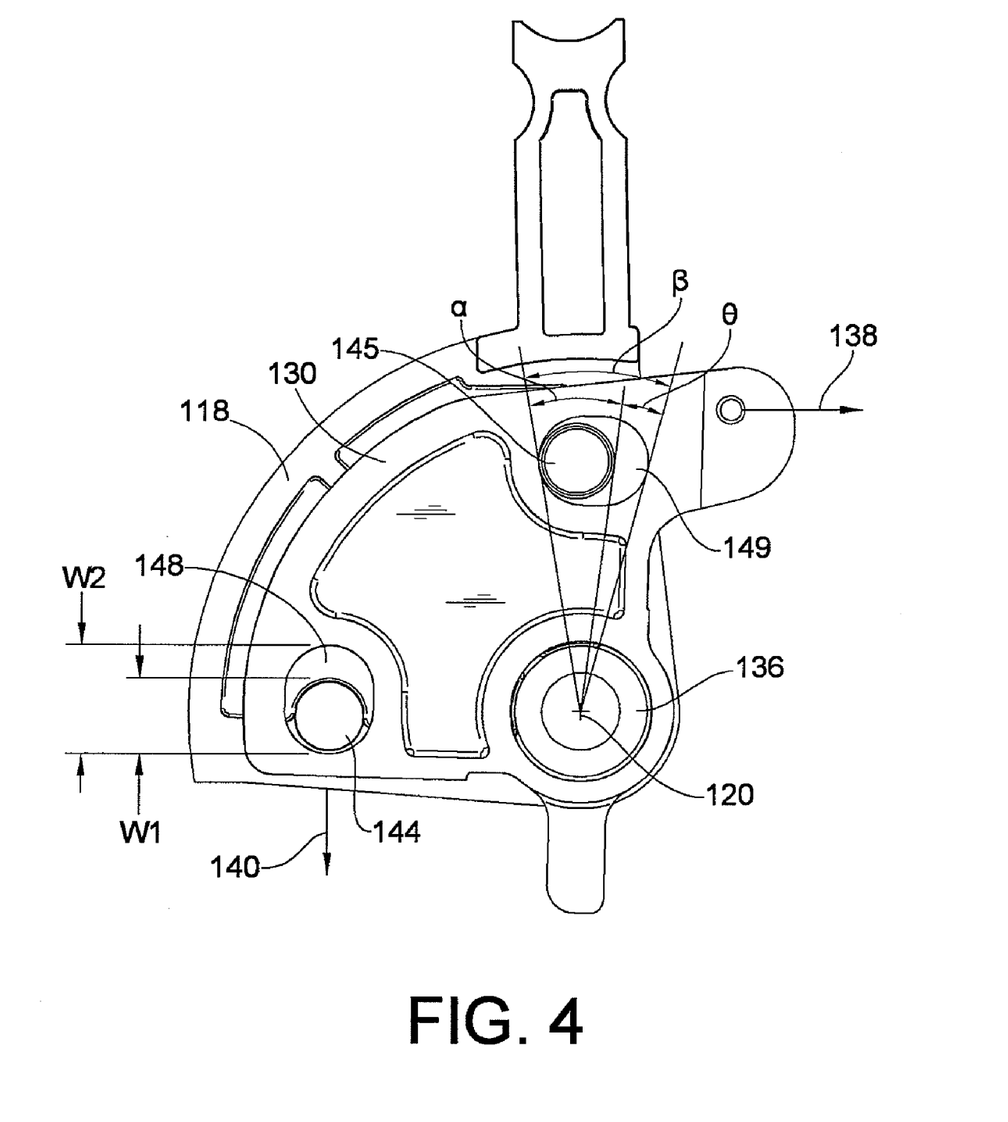
FIG. 4 is a bottom view of a drive gear and drive coupling coupled together in accordance with the teachings of the present invention.

The valve actuator includes a torque transfer arrangement, illustrated in FIG. 4 removed from the valve actuator, formed between the drive gear 118 and drive coupling 130 to transfer torque about axis 120 between the two components. More particularly, load applied to the drive coupling 130, such as by the return spring 128 (illustrated by arrow 138), is transferred to the drive gear 118 through the torque transfer arrangement, and similarly, load applied to the drive gear 118, such as by the electric motor (illustrated by arrow 140), is similarly transferred to the drive coupling 130 through the torque transfer arrangement.

The torque transfer arrangement of the illustrated embodiment includes a pair of pegs 144, 145 of the drive gear 118 that extend through a corresponding pair of slots 148, 149 of the drive coupling 130. The interaction between the pegs 144, 145 and slots 148, 149 prevents substantial relative angular motion between the drive gear 118 and drive coupling 130. As illustrated, the pegs 144, 145 are substantially identical to one another, and the slots 148, 149 are substantially identical to one another. The pegs 144, 145 are equally radially spaced from axis 120, while the slots 148, 149 are equally radially spaced from axis 120.

With further reference to FIG. 4, the widths W1 of the pegs 144, 145 are less than the widths W2 of the slots 148, 149. In a similar respect, the pegs 144, 145 extend angularly relative to axis 120 an angle $\alpha$, while the slots 148, 149 extend angularly relative to the axis 120 an angle $\beta$, with angle $\alpha$ being less than angle $\beta$. The difference between angle $\alpha$ and angle $\beta$ forms a degree or angle $\theta$ of relative angular motion that is permitted between the drive coupling 130 and the drive gear 118. Typically, the pegs 144, 145 and slots 148, 149 are sized and positioned such that the angle $\theta$ through which the two components may move angularly relative to one another is between about 1° and about 10°, and more preferably between about 2° and 5°.

As will be more fully explained below, the permitted degree of relative motion $\theta$ functions to reduce or limit the loading or impact applied to the drive gear 118 when the drive gear 118 and drive coupling 130 come to a stop after being driven by the return spring 128, such as when no power is applied to the electric motor 114.

Figure 5:
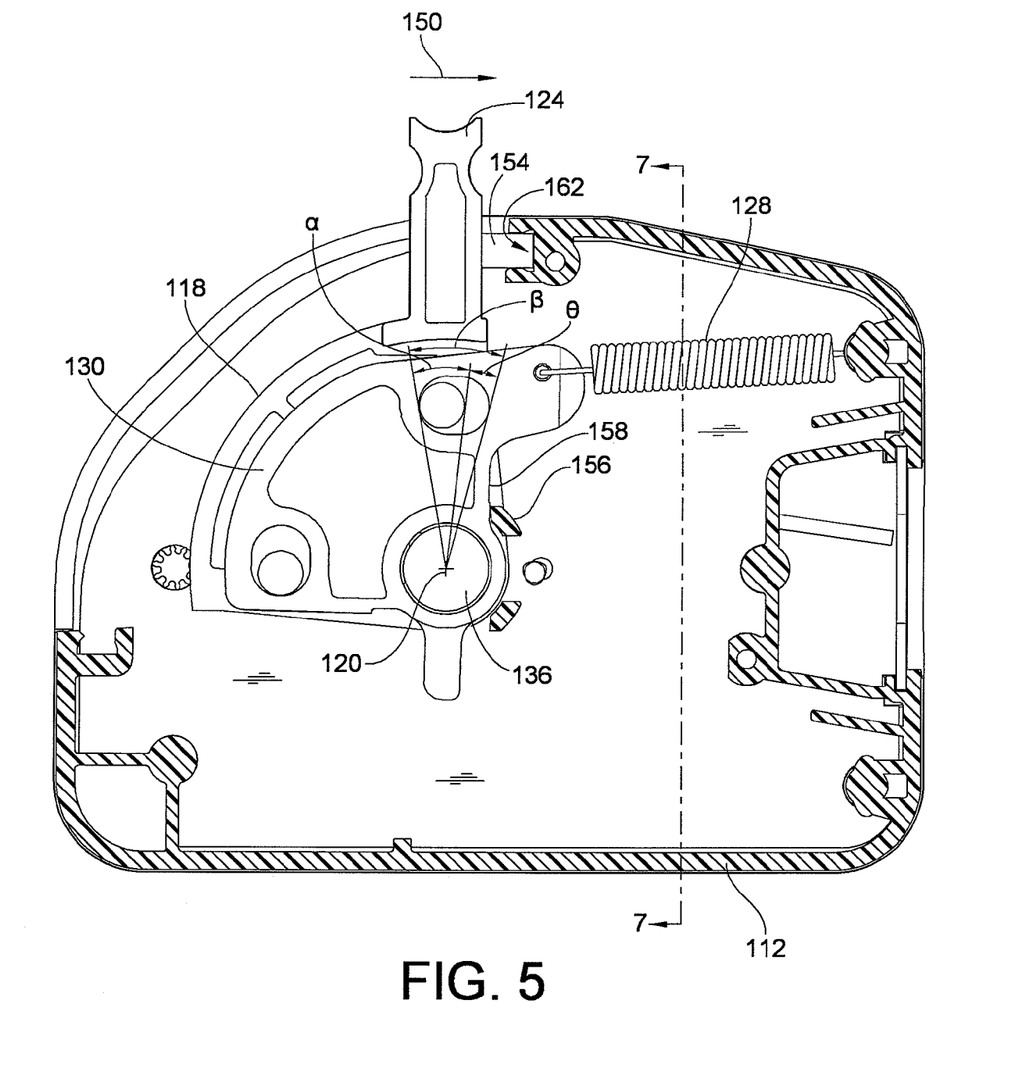
FIGS. 5 and 6 are partial cross-sectional illustration of the valve actuator of FIG. 1, viewed from the bottom illustrating relative movement between the drive gear and drive coupling.
Figure 6:
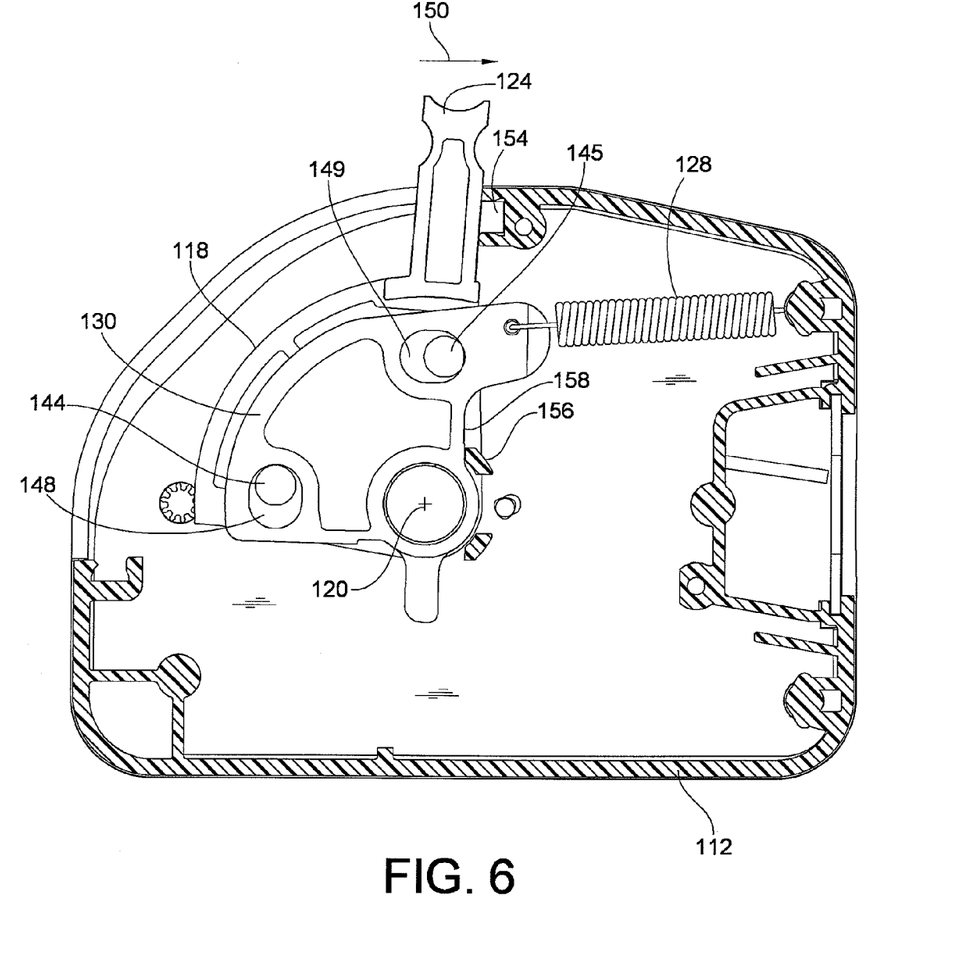
Figure 7:
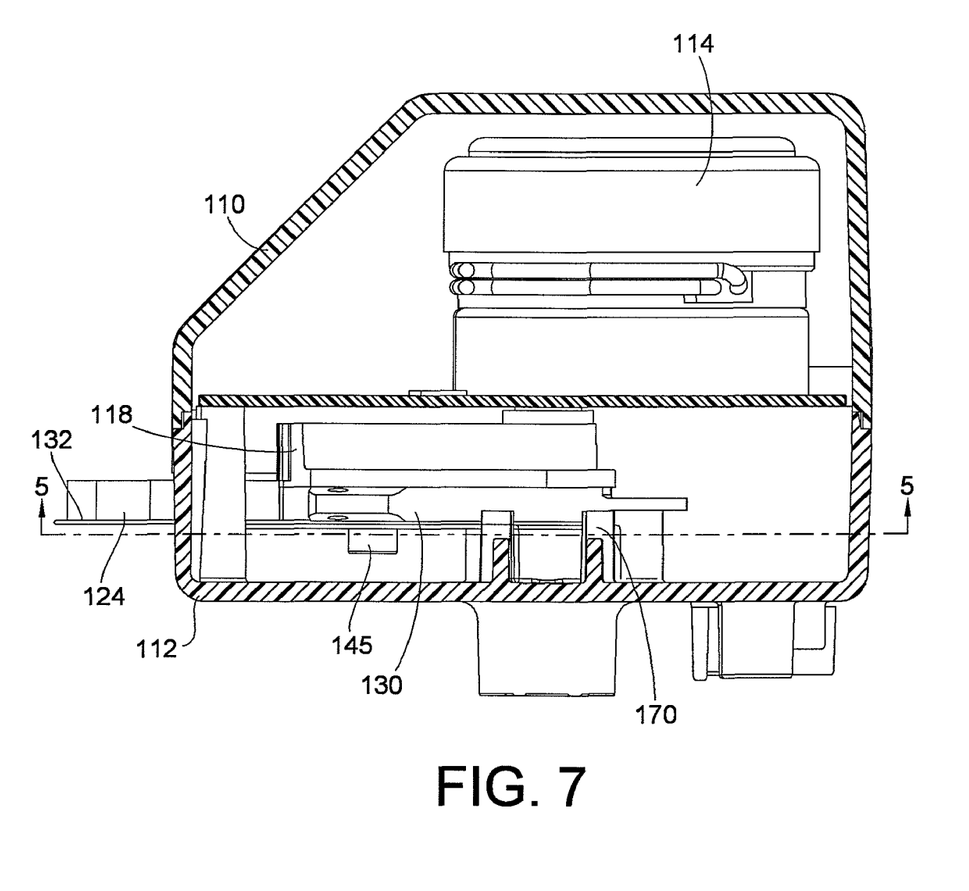
FIG. 7 is a cross-sectional illustration of the valve actuator of FIG. 1 taken about line 7-7 of FIG. 5.

FIGS. 5 and 6 illustrate the progression and relative movement of the drive gear 118 and drive coupling 130 as the return spring 128 drives the two components once power is removed from the electric motor 114. As return spring 128 retracts, return spring 128 drives drive coupling 130 angularly about axis 120 towards (as illustrated by arrow 150) stops 154, 156 of bottom housing part 112. The torque transfer arrangement causes the load of the return spring 128 to be transferred to the drive gear 118 causing the drive gear to similarly angularly rotate about axis 120.

Stop 154 stops the movement of the drive gear 154 in the appropriate orientation such that any attached valve member is in the desired predetermined position, i.e. either a closed or open position.

Stop 156 is a positive stop in the form of a wall against which a side 158 of drive coupling 130 impacts. Stop 156 only directly contacts the drive coupling 130 and does not directly contact drive gear 118. Stop 156 is preferably integrally formed in the bottom housing part 112 and is therefore typically a rigid plastic material such that limited energy is dissipated as the drive coupling 130 impacts stop 156. Further, when drive coupling 130 impacts stop 156, the drive coupling 130 is stopped from continuing to move angularly in the direction illustrated by arrow 150.

Stop 154 is an energy dissipating structure, most typically a foam material or similar material. Stop 154 only contacts drive gear 118, and more particularly, manually positioning lever 124 in the illustrated embodiment. Stop 154 is formed of a material that has a lower rigidity than stop 156. Stop 154 will compress when impacted by the manual positioning lever 124 allowing the drive gear 118 to continue to rotate in the direction it was driven by return spring 128 (i.e. the direction illustrated by arrow 150). As stop 154 compresses, kinetic energy of the drive gear 118 and momentum of the gear train is dissipated cushioning the stopping action of the drive gear 118. As such, the drive gear 118 will stop its movement in the direction illustrated by arrow 150 at a second angular position relative to the drive coupling 130.

While the drive gear 118 will stop at a second angular position relative to the drive coupling 130, the drive gear 118 may rotate back in the opposite direction of arrow 150, such as due to expansion of stop 154.

Stop 154 is secured in a channel 162 integrally formed in the bottom housing part 112.

In the illustrated embodiment, both the drive gear 118 and drive coupling 130 impact respective stops 154, 156 substantially simultaneously. However, because the torque transfer arrangement includes the slot and peg coupling arrangement, when the drive coupling stops after impacting stop 156, the drive gear 118 is permitted to continue traveling angularly relative to the drive coupling 130 in the direction illustrated by arrow 150. More particularly, the drive gear 118 is permitted to travel in direction 150 through the angle θ discussed previously.

Because the return spring 128 is coupled to the drive coupling 130 rather than directly to the drive gear 118, this additional angular movement of the drive gear 118 is free of any additional accelerating loading or biasing by the return spring 128. In fact, because the drive coupling 130 has come to a stop by impacting stop 156, the return spring 128 has stopped retracting during this movement of the drive gear 118 through angle θ. Thus, the drive gear 118 is permitted to decelerate over angle θ free of any loading by return spring 128 thereby reducing the impact loading on the gear train as the drive gear 118 comes to a stop.

An additional feature of the illustrated embodiment of the valve actuator 102 is that the valve actuator 102 can be configured to provide a return action by return spring 128 in both a clockwise or a counter clockwise configuration.

Figure 8:
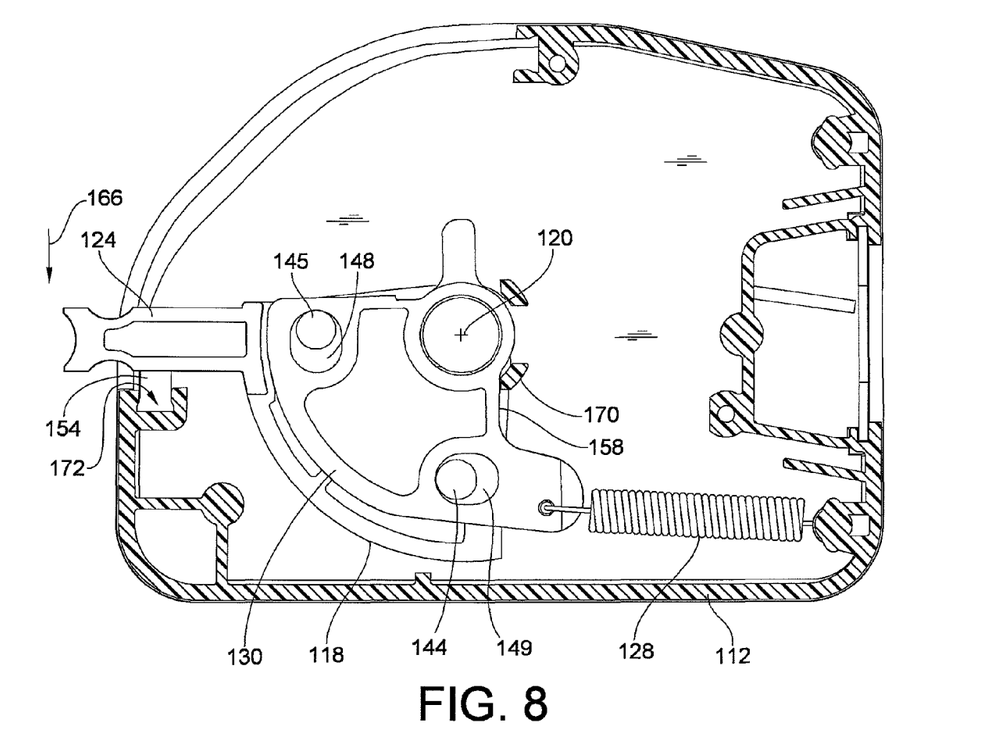
FIGS. 8 and 9 are similar to FIGS. 5 and 6 illustrating an alternative configuration of the valve actuator of FIG. 1 for rotation of the drive gear in an opposite direction as the configuration of FIGS. 5 and 6.
Figure 9:
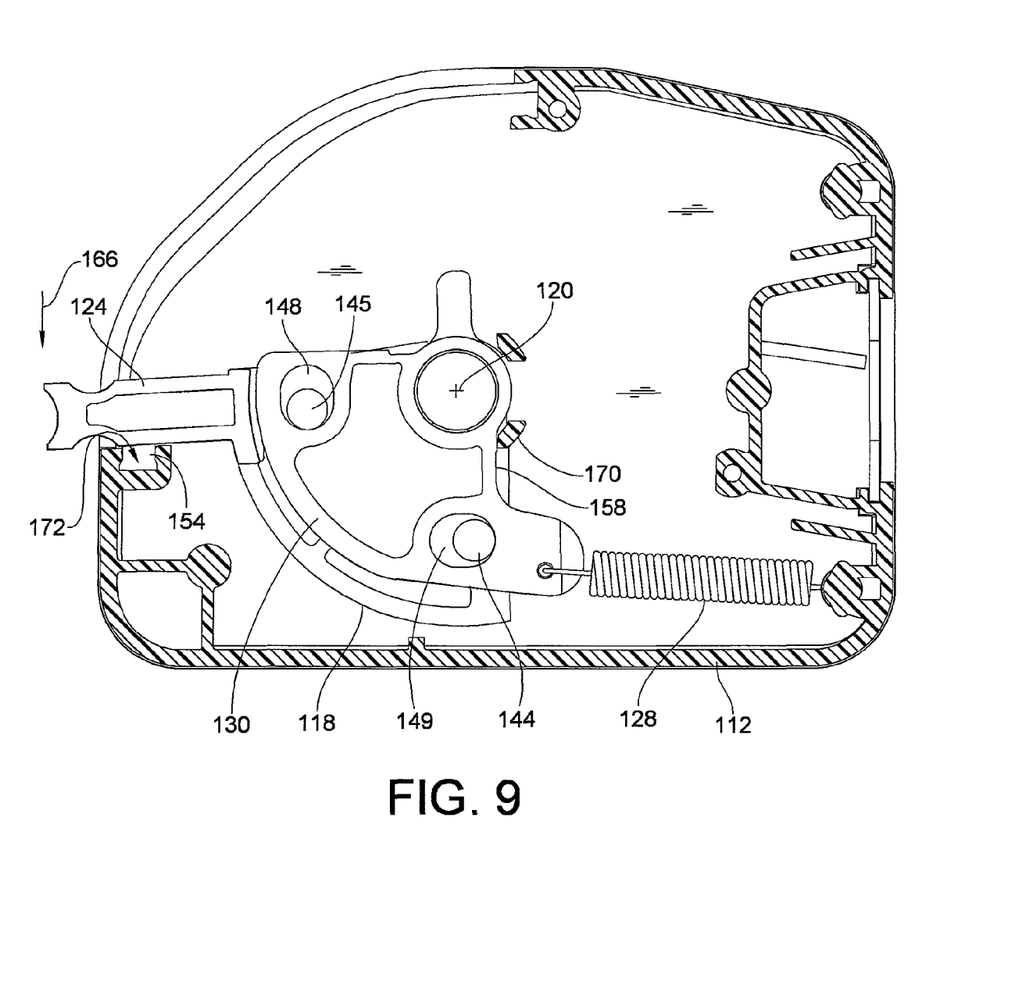

With reference to FIGS. 8 and 9, the drive coupling 130 can be flipped over, i.e. rotated 180 degrees about an axis extending perpendicularly to axis 120 and remounted to the drive gear 118. While not necessary in all configurations, return spring 128 is also moved such that it is connected to a different connection point of the bottom housing part 112. In this configuration, return spring 128 biases drive coupling 130, and thereby drive gear 118, in the opposite direction as the configuration illustrated in FIGS. 5 and 6, illustrated as arrow 166.

In this alternate configuration, the torque transfer arrangement permits reconfiguration of the valve actuator 102. More particularly, peg 144 extends through slot 149 rather than slot 148 and peg 145 extends through slot 148 rather than slot 149. Further, the support structure, and particularly the bottom housing part 112, includes an additional stop 170 integrally formed therein. Stop 170 is substantially identical to stop 156 and acts to stop angular movement of the drive coupling 130 when the return spring 128 drives the drive coupling 130 and drive gear 118 in the direction illustrated by arrow 166, being opposite the direction of the orientation of FIGS. 5 and 6. The bottom housing part 112 includes a fourth stop, or stop holder, in the form of channel 172, which is illustrated as holding stop 154.

Alternatively, the drive coupling 130 could be merely configured to have an attachment aperture on both sides of the drive coupling such that the drive coupling 130 need not even be re-oriented relative to the drive gear 118. Instead, the return spring 128 could be merely connected to a different location of the drive coupling 130 to effectuate biasing in the desired direction.

By the components of the valve actuator 102, namely the drive gear 118, drive coupling 130 and return spring 128, permitting easy reconfiguration to change the direction the return spring 128 drives the drive gear 118, the valve actuator 102 can be reconfigured for use with various types of valves. More particularly, the valve actuator 102 can be configured to drive valves that move either in a clockwise or counterclockwise direction, or that are desired to be normally-open or normally-closed. Similarly, such a configuration reduces the number of similar, but slightly different oriented, components that would be required to be manufactured or on hand at a manufacturing location during production of various actuator configurations. For instance, a single support structure and drive coupling can be manufactured for configuring valve actuators 102 that are defaulted to operate in opposite directions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve assembly, comprising:
a valve including a housing defining a flow path through the valve, and a valve member positioned within the housing and along the flow path, wherein relative orientation of the valve member with respect to the housing controls a flow of fluid through the valve along the flow path;
a valve actuator operably connected to the valve member to selectively govern the relative orientation of the valve member with respect to the housing, the valve actuator comprising:
a motor;
a drive gear operably coupled to the motor;
a support structure supporting the motor and the drive gear, the drive gear mounted to the support structure for rotation about an axis of rotation
a drive coupling operably coupling a return spring to the drive gear, the drive coupling coupled to the drive gear for rotation about the axis of rotation, the return spring operably coupled to the support structure and acting between the support structure and the drive coupling to rotationally bias the drive gear about the axis of rotation;
a torque transfer arrangement between the drive gear and drive coupling configured to operably transfer torque about the axis of rotation between the drive coupling and the drive gear, the torque transfer arrangement including at least one slot and at least one peg extending generally parallel with the axis of rotation into the at least one slot, the at least one slot having a first width extending generally perpendicular to the axis of rotation and the at least one peg having a second width extending generally perpendicular to the axis of rotation, the second width being less than the first such that limited relative angular movement between the drive coupling and drive gear is permitted; and
wherein the support structure includes a first stop positioned to stop angular movement of the drive coupling in a first rotational direction about the axis of rotation at a first angular position relative to the axis of rotation and a second stop positioned to stop angular movement of the drive gear in the first rotational direction about the axis of rotation at a second angular position relative to the axis of rotation, the second angular position being subsequent to the first angular position in the first rotational direction; and
wherein the support structure includes a third stop positioned to stop angular movement of the drive coupling in a second rotational direction, opposite the first rotational direction, about the axis of rotation at a third angular position relative to the axis of rotation and a fourth stop positioned to stop angular movement of the drive gear in the second rotational direction about the axis of rotation at a fourth angular position relative to the axis of rotation, the fourth angular position being subsequent to the third angular position in the second rotational direction.

2. A valve actuator comprising:
a motor;
a drive gear operably coupled to the motor;
a support structure supporting the motor and the drive gear, the drive gear mounted to the support structure for rotation about an axis of rotation
a drive coupling operably coupling a return spring to the drive gear, the drive coupling coupled to the drive gear for rotation about the axis of rotation, the return spring operably coupled to the support structure and acting between the support structure and the drive coupling to rotationally bias the drive gear about the axis of rotation;
a torque transfer arrangement between the drive gear and drive coupling configured to operably transfer torque about the axis of rotation between the drive coupling and the drive gear, the torque transfer arrangement including at least one slot and at least one peg extending generally parallel with the axis of rotation into the at least one slot, the at least one slot having a first width extending generally perpendicular to the axis of rotation and the at least one peg having a second width extending generally perpendicular to the axis of rotation, the second width being less than the first such that limited relative angular movement between the drive coupling and drive gear is permitted; and
wherein the support structure includes a first stop positioned to stop angular movement of the drive coupling in a first rotational direction about the axis of rotation at a first angular position relative to the axis of rotation and a second stop positioned to stop angular movement of the drive gear in the first rotational direction about the axis of rotation at a second angular position relative to the axis of rotation, the second angular position being subsequent to the first angular position in the first rotational direction; and
wherein the support structure includes a third stop positioned to stop angular movement of the drive coupling in a second rotational direction, opposite the first rotational direction, about the axis of rotation at a third angular position relative to the axis of rotation and a fourth stop positioned to stop angular movement of the drive gear in the second rotational direction about the axis of rotation at a fourth angular position relative to the axis of rotation, the fourth angular position being subsequent to the third angular position in the second rotational direction.

3. The valve actuator of claim 2, wherein the support structure is a housing substantially surrounding the drive gear, drive coupling, return spring and torque transfer arrangement, the drive gear including an integrally formed coupling shaft configured to operably transfer a drive torque from the drive gear to a valve stem of a valve, the coupling shaft including a cylindrical outer surface being coaxial with the axis of rotation, the drive coupling including a mounting aperture through which the coupling shaft extends, the outer diameter of the cylindrical outer surface being substantially equal to an inner diameter of the mounting aperture.

4. The valve actuator of claim 2, wherein the first and second stops are positioned such that the drive coupling and drive gear substantially simultaneously engage the first and second stops, respectively.

5. The valve actuator of claim 4, wherein the first stop is integrally formed by the support structure and formed from a first material and the second stop is formed of a second material, the second material being less rigid than the first material such that the drive gear stops after engaging the second stop in an angular distance greater than an angular distance in which the drive coupling stops after engaging the first stop.

6. The valve actuator of claim 2, wherein the difference between the width of the at least one peg and the width of the at least one slot permits relative angular movement between the drive gear and the drive coupling about the axis of rotation of between about 1 and 10 degrees.

7. The valve actuator of claim 6, wherein the difference between the width of the at least one peg and the width of the at least one slot permits relative angular movement between the drive gear and the drive coupling about the axis of rotation of between about 2 and 5 degrees.

8. The valve actuator of claim 2, wherein the drive gear, drive coupling and return spring are reconfigurable such that the return spring biases the drive gear in a second rotational direction.

9. The valve actuator of claim 8, wherein the drive coupling is rotated 180 degrees about a second axis extending perpendicular to the axis to reconfigure the drive gear, drive coupling and return spring, with the at least one peg and at least one slot engaging in both configurations.

10. The valve actuator of claim 9, wherein the at least one peg of the torque transfer arrangement includes first and second identical pegs and the at least one slot of the torque transfer arrangement includes first and second identical slots, wherein the drive gear includes the first and second pegs and the drive coupling includes the first and second slots.

11. The valve actuator of claim 10, wherein, in a first configuration, the first peg is received in the first slot and the second peg is received in the second slot, and in a second configuration, the first peg is received in the second slot and the second peg is received in the first slot.

12. A valve actuator comprising:
 a motor;
 a drive gear operably coupled to the motor;
 a drive coupling operably coupling a return spring to the drive gear, the drive coupling coupled to the drive gear for substantially coordinated rotation about an axis of rotation,
 a torque transfer arrangement interposed between the drive gear and drive coupling configured to operably transfer torque about the axis of rotation between the drive coupling and the drive gear, the torque transfer arrangement permitting a degree of angular movement between the drive coupling and drive gear;
 a support structure supporting the motor and the drive gear, the drive gear mounted to the support structure for rotation about the axis of rotation, the return spring operably coupled to the support structure and acting between the support structure and the drive coupling to rotationally bias the drive gear about the axis of rotation, the support structure including a first stop positioned to stop angular movement of the drive coupling in a first rotational direction about the axis of rotation at a first angular position relative to the axis of rotation and a second stop positioned to stop angular movement of the drive gear in the first rotational direction about the axis of rotation at a second angular position relative to the axis of rotation, the second angular position being subsequent to the first angular position in the first rotational direction, and the first and second stops being positioned relative to the axis of rotation such that the drive coupling and drive gear substantially simultaneously impact the first and second stops, respectively; and
 wherein the support structure includes a third stop positioned to stop angular movement of the drive coupling in a second rotational direction, opposite the first rotational direction, about the axis of rotation at a third angular position relative to the axis of rotation and a fourth stop positioned to stop angular movement of the drive gear in the second rotational direction about the axis of rotation at a fourth angular position relative to the axis of rotation, the fourth angular position being subsequent to the third angular position in the second angular direction.

13. The valve actuator of claim 12, wherein the first stop is integrally formed by the support structure and formed from a first material and the second stop is formed of a second material, the second material being less rigid than the first material such that the drive gear stops after engaging the second stop in an angular distance greater than an angular distance in which the drive coupling stops after engaging the first stop.

14. The valve actuator of claim 13, wherein the second material is an energy dissipating material.

15. The valve actuator of claim 12, wherein one or more of the drive coupling and return spring are repositionable relative to the drive gear such that the return spring biases the drive gear in the second rotational direction through the drive coupling.

16. The valve actuator of claim 15, wherein the third and fourth stops are positioned relative to the axis of rotation such that the drive coupling and drive gear substantially simultaneously impact the third and fourth stops, respectively.

* * * * *